Figure 1:
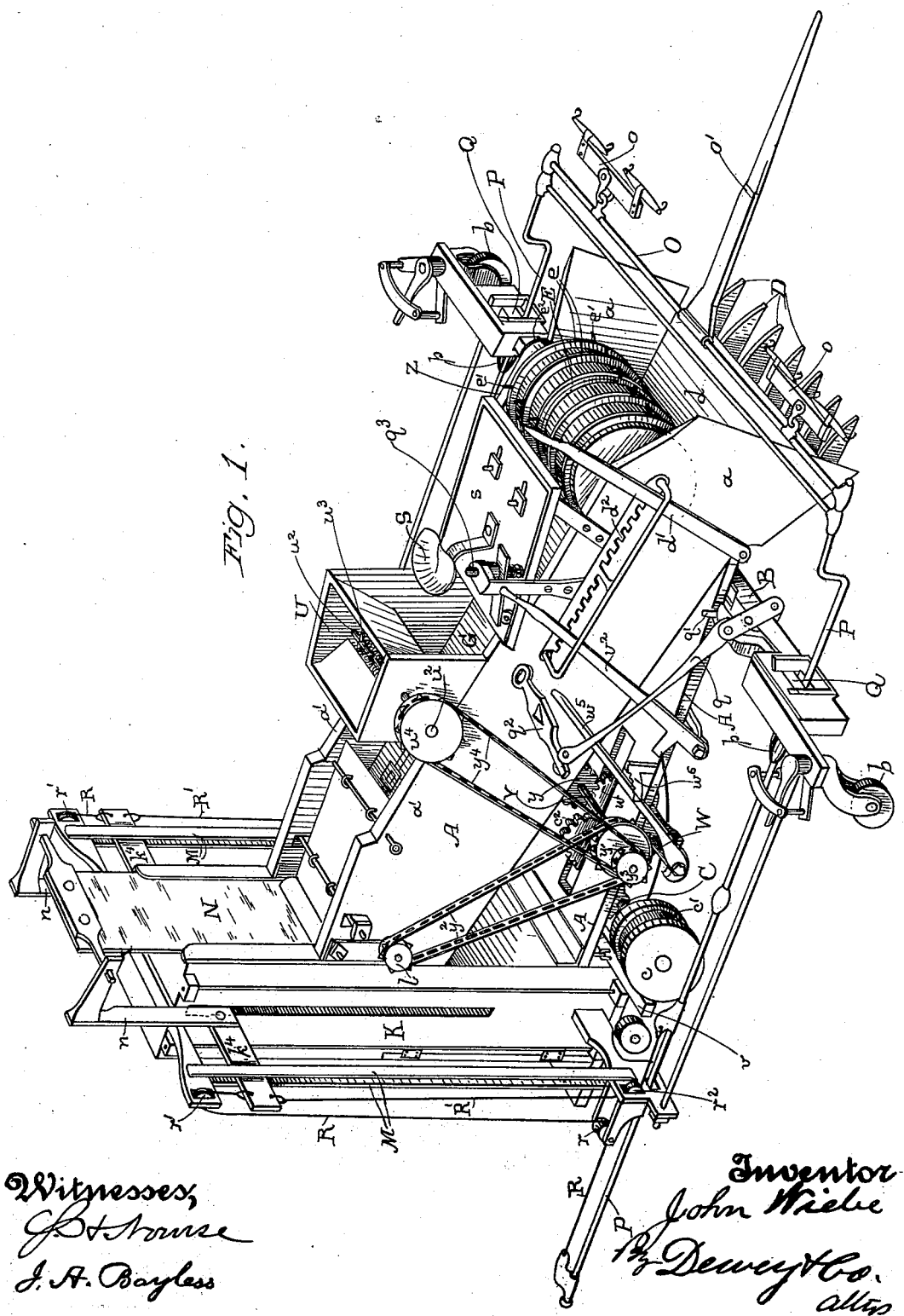

(No Model.)  3 Sheets—Sheet 1.

J. WIEBE.
TRAVELING BALING PRESS.

No. 506,892. Patented Oct. 17, 1893.

Witnesses,
G. H. Strouse
J. A. Bayless

Inventor,
John Wiebe
By Dewey & Co.
Attys (No Model.) 3 Sheets—Sheet 2.
J. WIEBE.
TRAVELING BALING PRESS.
No. 506,892. Patented Oct. 17, 1893.
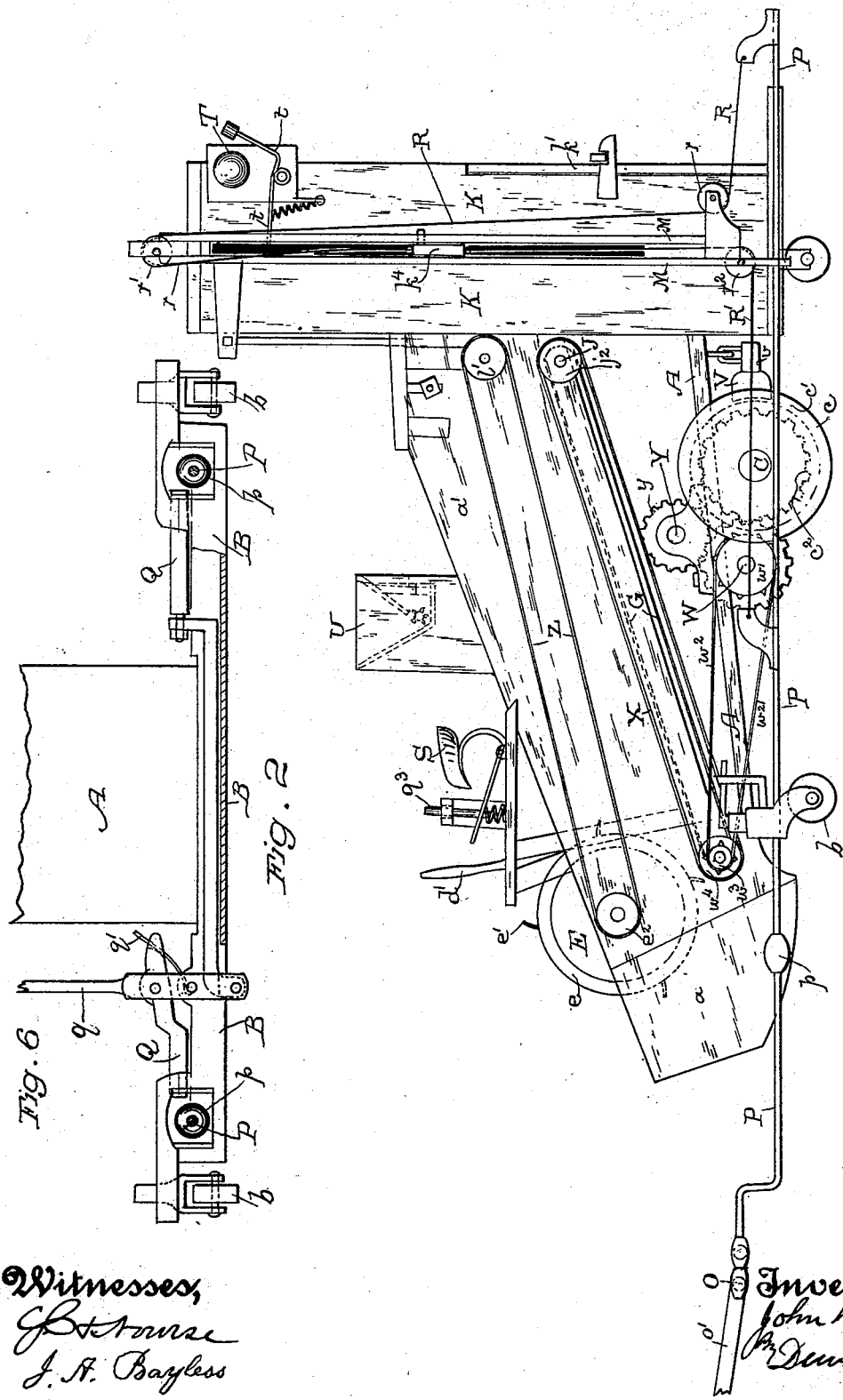
Witnesses:
Inventor,
John Wiebe (No Model.) 3 Sheets—Sheet 3.
J. WIEBE.
TRAVELING BALING PRESS.
No. 506,892. Patented Oct. 17, 1893.
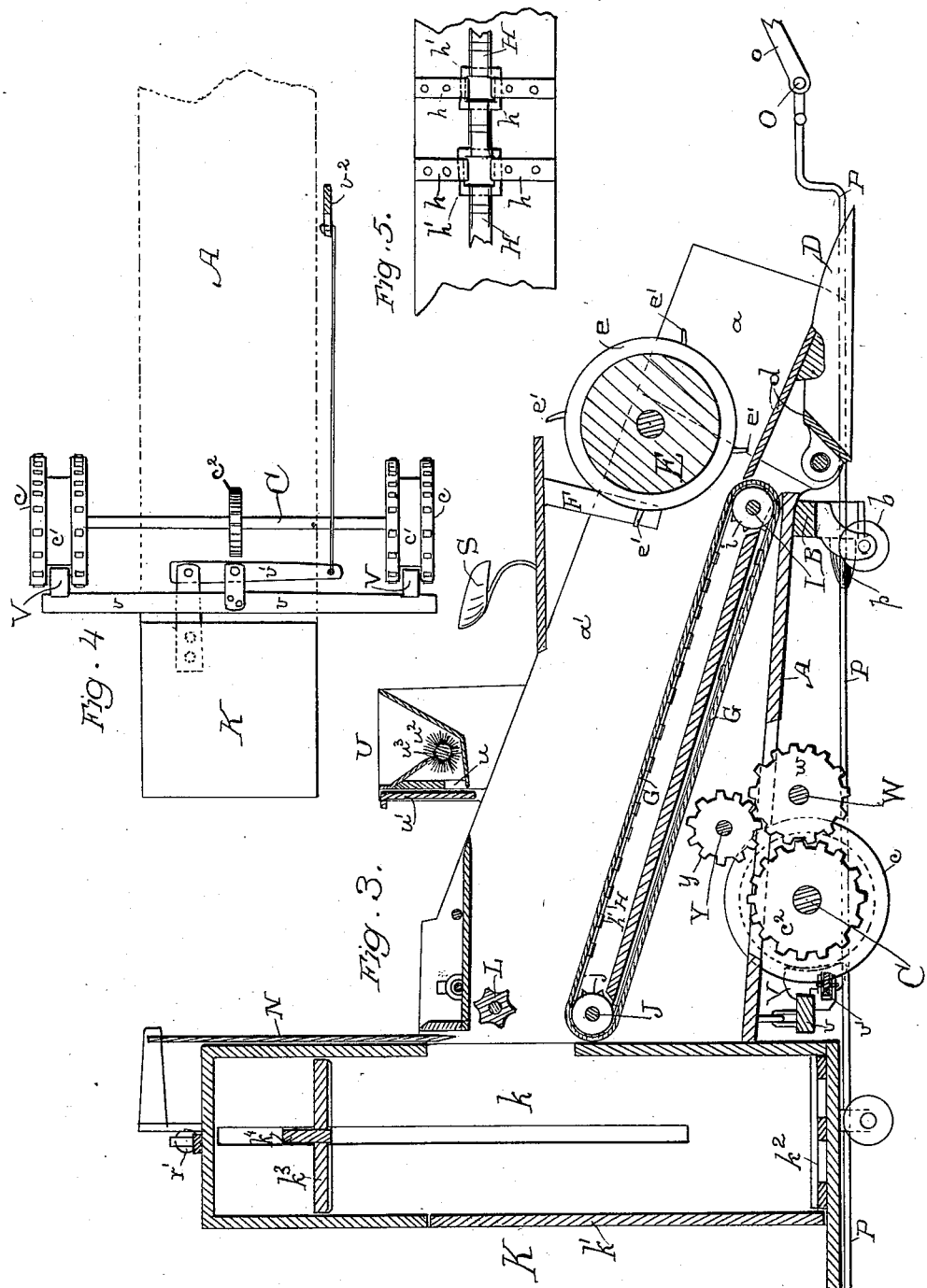
Witnesses,
G. H. Strouse
J. A. Bayless
Inventor
John Wiebe
By Dewey & Co.
Attys

UNITED STATES PATENT OFFICE.

JOHN WIEBE, OF SAN FRANCISCO, CALIFORNIA.

TRAVELING BALING-PRESS.

SPECIFICATION forming part of Letters Patent No. 506,892, dated October 17, 1893.

Application filed July 29, 1893. Serial No. 481,892. (No model.)

*To all whom it may concern:*

Be it known that I, JOHN WIEBE, a citizen of the United States, residing in the city and county of San Francisco, State of California, have invented an Improvement in Traveling Baling-Presses; and I hereby declare the following to be a full, clear, and exact description of the same.

My invention relates to the class of baling presses, and especially to a baling press adapted to be drawn about the field, and to feed itself automatically from the windrows.

My invention consists in a wheeled frame provided with means for taking the hay from the ground; means for elevating the hay; a baling chamber with contained follower into which the hay is delivered by the elevator; and means operated by the transference of the draft of the horses for actuating the follower of the baling chamber; all of which, together with details of construction and arrangement I shall hereinafter fully describe and claim.

The object of my invention is to provide a baling press adapted to be drawn about the field, and to take up its own hay and deliver it to the baling chamber wherein it is pressed by the draft of the horses in moving the machine.

Referring to the accompanying drawings for a more complete explanation of my invention, Figure 1 is a perspective view of my baling press. Fig. 2 is a side elevation of the same. Fig. 3 is a vertical longitudinal section. Fig. 4 is a detail showing the brake. Fig. 5 is a plan of a portion of the elevator showing its under side. Fig. 6 is an elevation of the front axle showing the stops Q by throwing rods P into and out of connection.

A is a frame-work which is mounted at its forward end upon an axle B which carries swivel wheels $b$, and at its rear end upon an axle C upon which are mounted rigidly the traction wheels $c$. At the front of the frame are side guards $a$ between which is mounted the rake D having a rocking head $d$ adjusted by a lever $d'$ which engages a rack $d^2$, and is within reach of the driver. By operating this lever the rake teeth may be elevated or depressed at such angle as may be desired to take up the hay. Over this rake is a revolving feeder drum E having peripheral flanges $e$ and projecting picker points $e'$. Back of this drum are secured the spaced stationary guards F between which the flanges and the picker points move. The drum has a rotation whereby its picker points, coming in contact with the hay on the rake, forces said hay backwardly the guards F preventing it from following the drum around.

Within the side pieces $a'$ of the main frame is mounted and adapted to travel an inclined elevator belt G, the lower end of which is in communication with the rear end of the rake whereby the hay forced back by the feeder drum is discharged upon the elevator belt. This elevator belt consists of a suitable body material to which is riveted on the under side by means of their side flanges $h$ the links $h'$ of an endless chain H which passes over a sprocket wheel $i$ on a shaft I at the lower end, and over a sprocket wheel $j$ on the shaft J at the upper end. These links of the chain lie along the middle of the elevator belt while their flanges extend transversely thereof and form supports for the belt. The upper end of the elevator belt is in communication with the baling chamber $k$ of the baling press K. This press consists of an upright frame-work forming part of the main and general frame of the machine. Its forward side is open to receive the hay from the upper end of the elevator belt, and just above said upper end is a rotating feed roller L which forces the hay into the baling chamber. The back of the baling chamber is provided with a discharge door $k'$, and within said chamber is the usual slatted bottom $k^2$ and a reciprocating follower $k^3$ operating vertically and having a cross-head $k^4$ extending outwardly through slots in the side of the baling press K. The ends of this cross-head are guided in vertical standards M, and said cross-head has connected with it by arms $n$ the dividing plate or knife N which passes down just back of the roller L and the upper end of the elevator belt whereby the continuous supply of hay is cut off during the operation of the follower in pressing a bale.

O is a draft bar to which the whiffletrees $o$ are connected and to which the pole $o'$ is also connected. To this draft bar are connected slide rods P which extend backwardly, one on each side of the machine, and are mounted in suitable guides extending therefrom, the forward guides being in ends of the front axle B. On these rods P are contacts $p$ which normally press behind sliding stops Q mounted in the forward axle B, and operated by means of a lever $q$ which is attached above its pivotal point on the axle with the stop on one side, and below its pivotal point with the shank of the stop on the other side, whereby the two stops are moved simultaneously in opposite directions. The lever is controlled by a spring $q'$ which tends to keep it thrown outwardly. This lever has a link $q^2$ on its top which is adapted to be fitted over a spring controlled pin $q^3$ on the platform $s$ whereon the seat S of the driver is located. When this link is free of the pin, the lever is held out so that its stops are projected and lie in the path of the contacts $p$ of the rods P whereby the draft from the draft bar O is against these stops, and the machine is thereby drawn along by the draft on the forward axle. But when the lever is drawn in and its top link engages the pin $q^3$, the stops Q are withdrawn and the slide rods P are free.

To the rear ends of the rods P are connected the chains or cables R which pass forwardly under fixed pulleys $r$, and thence upwardly over fixed pulleys $r'$, and down to the cross-head $k^4$ of the follower, to the upper side of which they are attached. Other cables or chains R' are attached to the lower side of the cross-head of the follower, and thence pass downwardly under fixed pulleys $r^2$ and are secured to the rods P.

Now, in the operation of the machine, when the baling chamber is full, the driver draws in the lever $q$ and holds it on the spring pin $q^3$ whereby the stops Q are withdrawn from in front of the contacts $p$ of the rods P. Now, the draft of the horses will pull these rods forwardly, whereby through the chains or cables R' the follower is caused to descend and press the material in the baling chamber. As soon as the bale is pressed and is properly roped or wired and discharged through the rear door, the horses are backed, whereby the rods P are moved backwardly, and through the chains or cables R the follower is raised to its upper limit again. Thereupon the driver releases the lever $q$ which, under the influence of its spring, throws outwardly the stops Q in front of the contacts $p$ of the rods P, thereby transferring the draft to the forward axle again. The hay, in being fed into the baling chamber presses upwardly the follower, and, in order to give notice when the baling chamber is full, I have an alarm gong mechanism represented by T, the tripping arm $t$ of which lies in the path of a small arm on the cross-head of the follower which, in rising, will sound the alarm as it passes, thereby giving notice that the baling chamber is full, and is ready to be operated upon by the follower.

U is a receptacle for salt. This is provided at its back with openings $u$, the capacity of which is controlled by a sliding gate $u'$, and within the receptacle is a rotating shaft $u^2$ with brushes $u^3$ whereby the salt is brushed out of the discharge openings and falls down directly into the hay upon the elevator.

V are the brakes operating upon peripheral grooves $c'$ of the traction wheels $c$. These brakes are carried by a bar $v$ operated by a lever $v'$ and connections to the main operating lever $v^2$.

The transmitting devices from the traction wheels are as follows:—Upon the axle C is a gear $c^2$ with which meshes a gear $w$ on a counter-shaft W; one end of this counter-shaft carries a sprocket-wheel $w'$ from which an endless chain $w^2$ extends to an idler sprocket-wheel $w^3$ carrying a pulley $w^4$ from which a belt X extends to a pulley $j^2$ on the upper shaft J of the elevator belt G whereby said elevator is driven. The gear $w$ also meshes with a gear $y$ on a counter-shaft Y which carries on one end a sprocket-wheel $x'$ from which an endless chain $y^2$ extends to a sprocket-wheel $l$ on the shaft of the feed roller L whereby the latter is driven. The shaft Y also carries a sprocket-wheel $y^3$ from which an endless chain $y^4$ extends to a sprocket-wheel $u^4$ on the shaft $u^2$ of the brushes $u^3$ in the salt receptacle U whereby they are driven. The other end of the shaft of feed roller L has a pulley $l'$ from which a belt Z extends to a pulley $e^2$ on the shaft of the feeder drum E whereby the latter is driven. In order to throw these power transmitting mechanisms into and out of gear I make the shaft W adapted to slide longitudinally in its bearings, whereby its gear $w$ will be thrown into and out of engagement with the gear $c^2$ on the axle C, and this sliding of the shaft is accomplished by a lever $w^5$ connected therewith and adapted to engage a rack $w^6$.

The general operation of the machine is as follows:—It is drawn over the ground and over the line of the windrow. The rake D takes up the hay and the feeder drum E feeds it backwardly onto the elevator G by which it is carried, and is delivered into the baling chamber by the combined action of the elevator and the feed roller L. As its rises in the baling chamber, the follower is pressed upwardly and gives warning of the full supply in said chamber. Thereupon the driver draws inwardly the lever $q$ whereby he withdraws the stops Q and the draft of the horses is thereupon transferred through the sliding rods P, and the chains or cables R' to draw down the follower and press the hay in the baling chamber. As the follower descends the dividing plate N moves down and stops the supply from the elevator. After the bale is complete and discharged, the horses are backed whereby the follower is returned through the slide rods P and cables R, and thereupon the lever $q$ is released from the spring pin whereby its stops Q spring out again in front of the contacts p of the rods P and the draft is thereby transferred to the forward axle of the machine.

Having thus described my invention, what I claim as new, and desire to secure by Letters Patent, is—

1. In a traveling baling press, the combination of a wheeled frame having a draft bar, a rake connected with the front portion of said frame and adapted to lift the hay from the ground, an elevator adapted to receive and convey the hay to the back of the frame, a baling press adapted to receive the hay from the elevator, said press having a follower and connections with the draft bar of the wheeled frame for operating the follower of the press, substantially as herein described.

2. In a traveling baling press, the combination of a wheeled frame, a rake connected with the front portion thereof and adapted to lift the hay from the ground, an elevator adapted to receive and convey the hay to the back of the frame, a baling press adapted to receive the hay from the elevator, said press having a follower, a draft bar normally connected with the wheeled frame for drawing it, means for releasing said connection, and devices connecting said draft bar with the follower of the press whereby the follower is operated when the draft bar is released from direct connection with the wheeled frame, substantially as herein described.

3. In a traveling baling press, the combination of a wheeled baling frame with a reciprocating follower having a cross-head, a draft bar to which the horses are attached, sliding rods connected with said draft bar, chains or cables connected with said rods and with the cross-head of the follower for operating it, and a means for locking and releasing the sliding rods, substantially as herein described.

4. In a traveling baling press, the combination of a wheeled frame, a baling frame with reciprocating follower therein and carried by the wheeled frame, a draft bar, sliding rods connected with the draft bar, chains or cables connecting said rods with the follower of the baling press, and a stop device for locking the sliding rods to the main frame to draw the machine, and relieving them to operate the follower, substantially as herein described.

5. In a traveling baling press, the combination of a wheeled frame, a baling frame with reciprocating follower therein and carried by the wheeled frame, a draft bar, sliding rods connected with the draft bar, chains or cables connecting said rods with the follower of the baling press, and a stop device for locking the sliding rods to the main frame to draw the machine and relieving them to operate the follower, consisting of the lever controlled stops on the forward axle of the frame, and the contacts on the sliding rods, substantially as herein described.

6. In a traveling baling press, the combination of a wheeled frame, a baling frame with reciprocating follower therein and carried by the wheeled frame, a draft bar, sliding rods connected with the draft bar, chains or cables connecting said rods with the follower of the baling press, and a stop device for locking the sliding rods to the main frame to draw the machine and relieving them to operate the follower, consisting of the sliding stops on the forward axle of the frame the lever operating them, the contacts on the sliding rods, the link of the lever and the trip pin with which the link engages, substantially as herein described.

7. In a traveling baling press, the combination of a wheeled frame, a rake carried in its front portion, a revolving feeder drum above said rake for feeding the hay backwardly, a traveling elevator to receive and convey the hay to the rear of the frame, a feed roller over said elevator, a baling press carried by the rear of the frame and having a follower, and the means for drawing the frame and operating the follower consisting of the slide rods attached to the draft bar, the cables connecting said rods with the follower, the sliding stops on the axle of the frame and the contacts on the rods, substantially as herein described.

8. In a traveling baling press, the combination of a wheeled frame, a rake carried in its front portion, a revolving feeder drum above said rake for feeding the hay backwardly a traveling elevator to receive and convey the hay to the rear of the frame, a feed roller over the elevator, a baling press carried by the rear of the frame and having a follower, the dividing plate connected with the follower and adapted to cut off the supply of hay from the elevator to the baling press, and the means for drawing the frame and operating the follower consisting of the slide rods attached to the draft bar, the cables connecting said rods with the follower, the sliding stops on the axle of the frame and the contacts on the rods, substantially as herein described.

9. In a traveling baling press, the combination of a wheeled frame having a draft bar, a rake at its forward end, a feeder drum over the rake, a traveling elevator, a feed roller over said elevator a receptacle for salt over said elevator having means for discharging its contents thereon, a baling chamber having a reciprocating follower, and into which the elevator discharges the hay, and means for connecting the follower of the baling chamber with the draft bar of the team whereby the follower is operated when the draft bar is released from connection with the frame, substantially as herein described.

In witness whereof I have hereunto set my hand.

JOHN WIEBE.

Witnesses:
S. H. NOURSE,
J. A. BAYLESS.